(12) United States Patent
Karo

(10) Patent No.: US 8,316,075 B2
(45) Date of Patent: Nov. 20, 2012

(54) MULTIPROCESSOR NODE CONTROL TREE

(75) Inventor: Michael Karo, Seattle, WA (US)

(73) Assignee: Cray Inc., Seattle, WA (US)

( * ) Notice: Subject to any disclaimer, the term of this patent is extended or adjusted under 35 U.S.C. 154(b) by 691 days.

(21) Appl. No.: 12/124,796

(22) Filed: May 21, 2008

(65) Prior Publication Data

US 2009/0292900 A1 Nov. 26, 2009

(51) Int. Cl.
G06F 15/163 (2006.01)
G06F 9/00 (2006.01)

(52) U.S. Cl. ..................... 709/201; 709/220

(58) Field of Classification Search ........... 709/201, 709/208–211, 220–226; 707/770, 966–974; 711/147–221; 719/311–332; 718/718; 712/1, 712/28–34, 200, 209
See application file for complete search history.

(56) References Cited

U.S. PATENT DOCUMENTS

| 4,845,744 A * | 7/1989 | DeBenedictis ............ 379/88.22 |
| 5,303,383 A * | 4/1994 | Neches et al. ................ 712/43 |
| 2006/0136881 A1 * | 6/2006 | Nesbitt et al. ................ 717/140 |

* cited by examiner

Primary Examiner — Wing Chan
Assistant Examiner — Ruolei Zong
(74) Attorney, Agent, or Firm — Larkin Hoffman Daly & Lindgren; Robert C. Klinger

(57) ABSTRACT

Control messages are sent from a control processor to a plurality of attached processors via a control tree structure comprising the plurality of attached processors and branching from the control processor, such that two or more of the plurality of attached processor nodes are operable to send messages to other attached processor nodes in parallel.

21 Claims, 3 Drawing Sheets

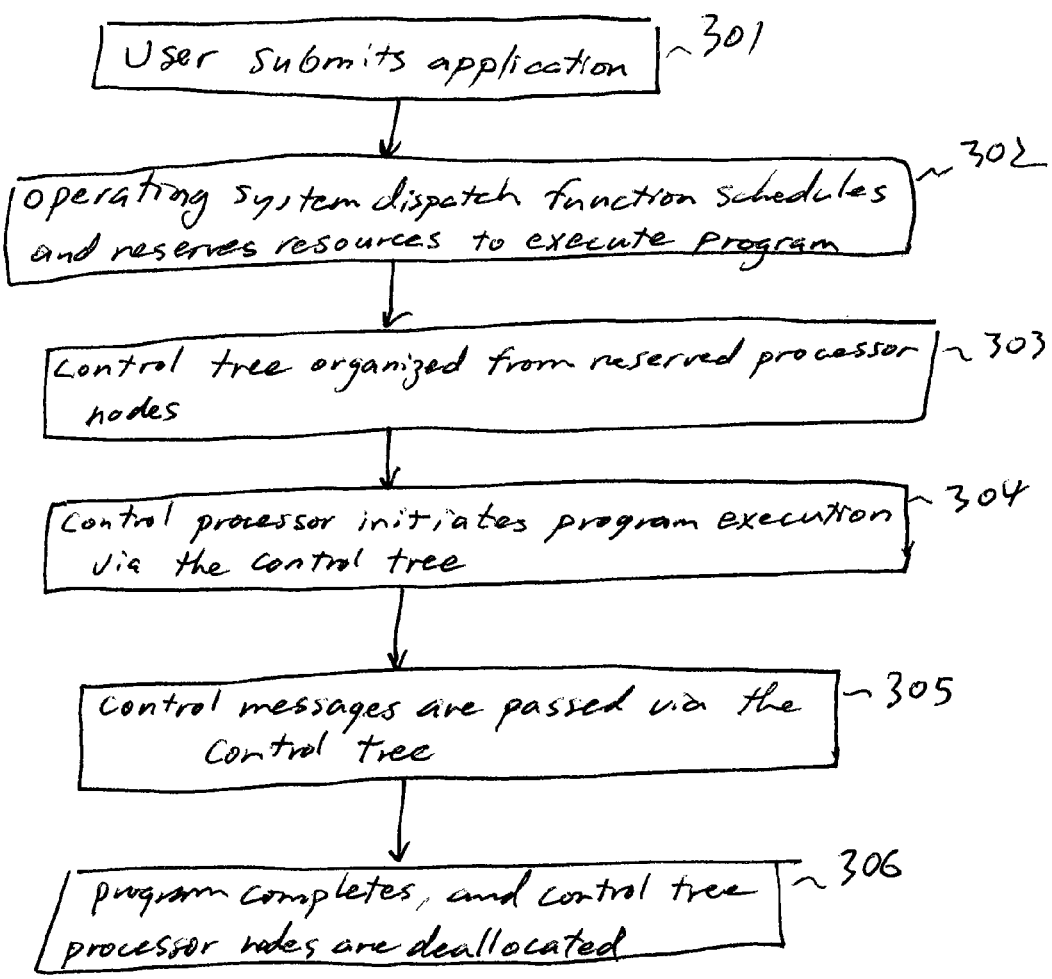

MULTIPROCESSOR NODE CONTROL TREE

FIELD OF THE INVENTION

The invention relates generally to multiprocessor computer systems, and more specifically to a control tree for message distribution in a multiprocessor computer system.

BACKGROUND

Most general purpose computer systems are built around a general-purpose processor, which is typically an integrated circuit operable to perform a wide variety of operations useful for executing a wide variety of software. The processor is able to perform a fixed set of instructions, which collectively are known as the instruction set for the processor. A typical instruction set includes a variety of types of instructions, including arithmetic, logic, and data instructions.

In more sophisticated computer systems, multiple processors are used, and one or more processors runs software that is operable to assign tasks to other processors or to split up a task so that it can be worked on by multiple processors at the same time. In such systems, the data being worked on is typically stored in memory that is either centralized, or is split up among the different processors working on a task.

Instructions from the instruction set of the computer's processor or processor that are chosen to perform a certain task form a software program that can be executed on the computer system. Typically, the software program is first written in a high-level language such as "C" that is easier for a programmer to understand than the processor's instruction set, and a program called a compiler converts the high-level language program code to processor-specific instructions.

In multiprocessor systems, the programmer or the compiler will usually look for tasks that can be performed in parallel, such as calculations where the data used to perform a first calculation are not dependent on the results of certain other calculations such that the first calculation and other calculations can be performed at the same time. The calculations performed at the same time are said to be performed in parallel, and can result in significantly faster execution of the program. Although some programs such as web browsers and word processors don't consume a high percentage of even a single processor's resources and don't have many operations that can be performed in parallel, other operations such as scientific simulation can often run hundreds or thousands of times faster in computers with thousands of parallel processing nodes available.

The program runs on multiple processors by passing messages between the processors, such as to share the results of calculations, to share data stored in memory, and to configure or report error conditions within the multiprocessor system. Communication between processors is an important part of the efficiency of a multiprocessor system, and becomes increasingly important as the number of processor nodes reaches into the hundreds or thousands of processors, and the processor network distance between two processors becomes large.

The network connection scheme or topology that links the processors, the speed and data width of the network connections, and the efficiency of the messaging protocols used are among the factors that play significant roles in how efficiently the processor interconnect network can handle tasks such as launching a program, retrieving data from remote memory, or sending other messages between processors working together to execute a program.

SUMMARY

One example embodiment of the invention comprises sending control messages from a control processor to a plurality of attached processors via a control tree structure comprising the plurality of attached processors and branching from the control processor, such that two or more of the plurality of attached processor nodes are operable to send messages to other attached processor nodes in parallel.

BRIEF DESCRIPTION OF THE FIGURES

FIG. 3 shows an example method of using a control tree to configure and operate a group of processors in a multiprocessor communications network, consistent with some embodiments of the invention.

DETAILED DESCRIPTION

Figure 1:
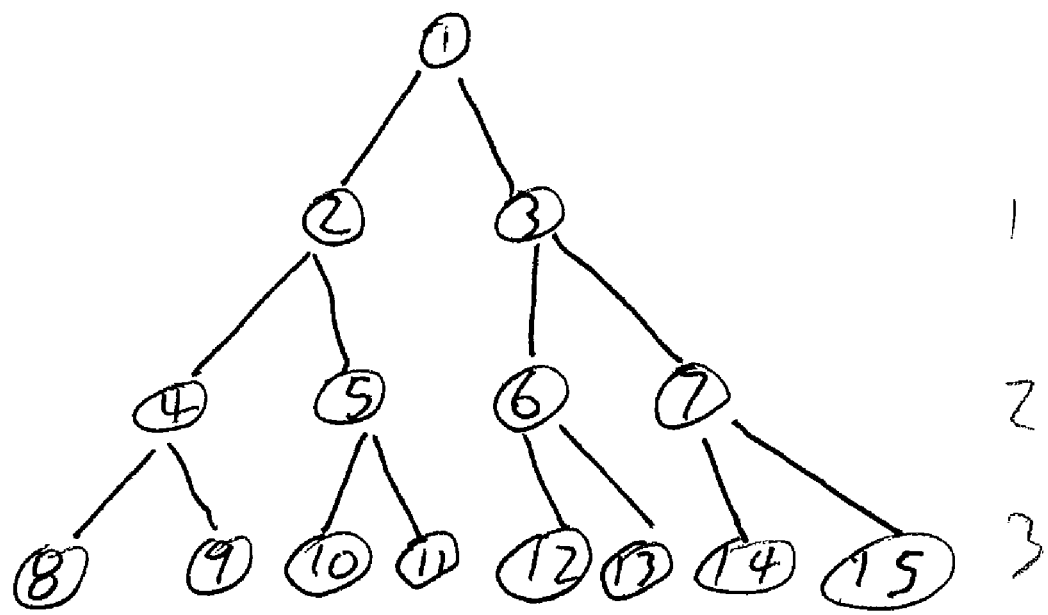
FIG. 1 shows a 15 processor control tree having three network connections per node, consistent with an example embodiment of the invention.

In the following detailed description of example embodiments of the invention, reference is made to specific example embodiments of the invention by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit other embodiments of the invention or the invention as a whole, and any reference to the invention, its elements, operation, and application do not limit the invention as a whole but serve only to define these example embodiments. The following detailed description does not, therefore, limit the scope of the invention, which is defined only by the appended claims.

Computers typically perform tasks or run software programs by executing program instructions in a processor. The computer also uses a variety of computer peripheral components such as video interfaces, storage, and network interfaces to perform various functions, some of which have their own dedicated processors to perform specialized functions at the instruction of the computer's main processor. But, the extent of a computer's ability to perform tasks quickly, or to perform a large number of tasks at the same time, is generally limited by the capabilities of the computer's processor. While processor technology has kept pace with computing demands of the typical personal computer user, large computers used for scientific research and other complex tasks require significantly more computing power to perform large and complex tasks in a reasonable amount of time.

Large computer systems and supercomputers typically therefore use many processors in the same computer system, and use various methods of dividing the work to be done among the processors. Typically, a software program that has been written or compiled to run on a computer with multiple processors will use each processor assigned to the program to execute different parts of the software program or perform different calculations, and to communicate the results of each portion of the program back to a central processor. In other examples, different programs running at the same time run on different groups of processors, as assigned by a control program executing on the computer system.

Parallelization is managed by various components of the computer system, including the compiler, the individual processor elements and their processor network interfaces, and the operating system for the parallel computer system. These system elements ensure that the processors are performing tasks in the proper order, and that operations that rely on data from other processors utilize data that has already been properly computed but that is not out-of-date. They also control the passing of information between processors, such as sending program instructions to each processor, updating data, and sending results back to other processors.

The processors working in parallel on a program or task communicate information with one another via a processor interconnect network, which typically includes several connections from each processor to different neighboring processors. The network is used to distribute software instructions to be run on the various processors, to exchange messages such as memory contents and program results with other processors, and to perform other communication functions. Typical network configurations resemble cubes, toroids, or other shapes, often with extra connections linking one side of the network to another for added communication efficiency.

Computers such as this are often called parallel processing computers, multiprocessor computers, or if large numbers such as hundreds or thousands of processors are used, massively parallel computer systems. Such systems are able to take complex tasks that can be performed in parallel, divide the work among many processors, and combine the work of the many processors to perform a task hundreds or thousands of times faster than could be achieved with traditional single-processor computer systems.

The performance of a parallel computer system is based on a variety of factors, including the extent to which a program can be executed in parallel, the performance of the individual processors, and the efficiency of the operating system and network that link the processors together. A variety of other factors, such as memory and storage performance, and the accuracy and efficiency of locally cached copies of data, also play significant roles in determining a parallel computer's performance.

Even very large and complex multiprocessor computer systems often use commonly available processors, memory, and other components, sometimes much like those found in personal computers and servers. As hundreds or thousands of commercial quality components are used to build a multiprocessor computer system, the chances of a component failure somewhere in the system become dramatically larger over a given time period than for a typical personal computer or server. A variety of data integrity methods are therefore often used to detect and sometimes correct errors in multiprocessor systems, such that a large multiprocessor computer system that is itself relatively reliable can be assembled from relatively unreliable parts.

Allocating a group of processors for a particular program, and sending messages to processors within a group, is typically performed by sending a broadcast message to all processors, or by sending individual messages to each of the processors in a group. Each has its disadvantages, as sending an individual message to each of a large number of processors can require a relatively large number of individual messages be sent from a processor node acting as the control processor or message originator, while sending a multicast message to every processor involves sending the message to perhaps thousands of processors that are not part of the intended processor group assigned to the program or task.

FIG. 1 illustrates a control tree in a multiprocessor computer system, consistent with an example embodiment of the invention. The control tree is used in some embodiments of the invention to provide a more efficient method of sending messages from a central node such as a control processor to other processors in a group, and to provide a mechanism for monitoring and reporting the state of processors in the control tree. In this example, 15 processors from a large multiprocessor system are allocated to a program under the control of processor 1, which communicates with the rest of the processors in the assigned processor group via the control tree structure.

The control processor numbered "1" in FIG. 1 is in this example coupled to fourteen other processors as part of the control tree, and is at the top of a tree having three further layers of processors. Each processor not in the top or bottom layer is connected to three other processors, which is relatively low for modern multiprocessor systems but illustrates a simple tree structure well for purposes of this example. The control processor 1 at the top of the tree is coupled to processors 2 and 3, and sends messages to these two processors and receives messages from these two processors. Similarly, each of processors 2 and 3 are coupled to two more processors—4 and 5 for processor 2, and 6 and 7 for processor 3. Each of these processors 4, 5, 6, and 7 is again coupled to two more processors, and communicates messages back and forth with these processors.

A message that is to be sent to all processors can therefore be sent to all fifteen processors in the same time it would take to send a message from one processor to a second, third, and fourth processor in sequence. This is because messaging efficiency is gained in that each processor until the last layer of the tree sends messages to two other processors at the same time, resulting in a fan-out distribution of the message and relatively efficient distribution. Similarly, a message to be sent back to a control node will reach the node in a maximum of three message cycles, due to the efficiency of the control tree structure.

The control tree of FIG. 1 has the further advantage that although the processors that are a part of the control tree shown in FIG. 1 may be a part of a very large processor network, the messages exchanged within this particular group of processors are only sent to processors in the processor control tree. This results in greater efficiency of communication in the processor network outside of the processors allocated to the particular control tree shown in FIG. 1, as messages intended for processors in the control tree are not sent to processors outside the control tree that do not need to receive the messages.

Figure 2:
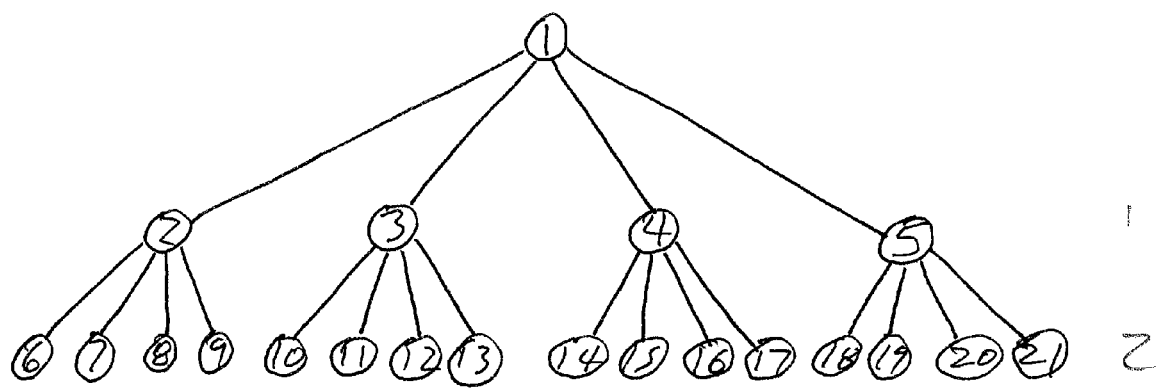
FIG. 2 shows a 21 processor control tree having five network connections per node, consistent with some embodiments of the invention.

In another example shown in FIG. 2, each processor in the intermediate layers of the control tree is coupled to five other processors, consistent with an example of the invention. The greater number of processor connections per processor or node shown in FIG. 2 is also sometimes referred to as a higher radix, and can result in greater efficiency in message communication in a processor network. In the example shown here, only two layers of processors beyond the control processor are needed to provide communication between a group of 21 processors, while two layers beyond the control processor in FIG. 1 only provided communication between seven processors. The greater number of processor network connections per processor has the disadvantage that a greater number of messages may come from different connected processors at one time or during a certain period of time, resulting in greater network congestion in the processor.

The control tree is used in some embodiments to configure and operate a group of processors in a multiprocessor communications network, as illustrated in the example shown in FIG. 3, Here, a computer user submits an application via an operating system at 301, which uses a dispatching function to obtain scheduling and authorization information at 302. This includes a list of processors allocated to execute the software instructions for the software application being run, which are associated with one another and organized into a control tree such as that of FIG. 2 at 303. In some examples, the processors are directly coupled to one another as shown in FIG. 2, while in other examples the processors in a control tree such as that of FIG. 2 may communicate via one or more intermediate processors that are not a part of the control tree.

Organization of the control tree includes in this example sending reservation information to the processors in the tree, which occurs relatively efficiently via the control tree structure. At 304, the control processor distributes portions of the program to the processors in the control tree, and the program segments begin executing. In a further embodiment, the control processor is contacted by a system-wide control processor with the information regarding reservation and software code distribution, and distributes the information to the other reserved processors via the control tree.

At 305, standard input messages are distributed from the control processor to the other processor nodes in the control tree, and standard output messages are routed from the various processor nodes in the control tree to the control processor as the program executes. When the program is complete, it is terminated at the direction of the control processor, and the control tree processors are released via control messages sent from the control processor at 306.

Because the number of layers in the control tree is limited even with very large numbers of processors reserved for a particular application, program initialization is significantly faster than was possible with prior methods of multiprocessor system program initiation. This is due in part to the rapid fan-out of the control tree, such that message forwarding is very much a parallel operation once the control tree is a few layers deep, and the selected radix or number of network connections per processor in the processor network.

Configuration data and standard input/output messages are also communicated via the control tree in further embodiments. For example, if a processor deep in the control tree such as processor 8 of FIG. 1 generates an output message, such as to print a message to standard out or to the console, it is forwarded back up the control tree to processor 4, processor 2, and to the control processor 1. Similarly, error messages such as program errors, data errors or data locks, and hardware failures are passed up the control tree to the control processor, so that handling of standard input and output, error messages, and configuration messages can be centrally managed.

In some examples, certain messages need only be delivered to a certain node or group of nodes. In one such example, a message sent to a first group of nodes is distributed only through a portion of the control tree needed to reach those nodes, avoiding a multicast message that consumes bandwidth over the entire processor network. In another example, a medium-sized application that uses only tens or hundreds of processors may use a smaller radix, such as where each node is coupled to eight other nodes below it. When a larger application is being executed, using thousands of nodes, a larger radix of 16 or 32 may be utilized for more efficient distribution of messages in the control tree. In an alternate embodiment, the radix is dependent on the number of processors in the computer system, or is dependent on both the number of processor nodes in the system and the number of processor nodes being used by a specific application.

Other messages such as cache invalidation are handled by the executing application, and can travel through the processor interconnect network both within and external to the control tree processors or nodes. In many embodiments, this is handled by a Message Passing Interface (MPI), or other program component to facilitate coordination of program data messages between processors during execution.

If a processor or node fails during execution, the control tree structure breaks and an error message is passed back up the control tree to the control processor. The remaining processors in the control tree are then freed, and the tree is reinitialized with the appropriate number of processors to restart program execution. The number of processors may not be the same as the number previously assigned to the program, and may in some cases include substantially or only those processors previously in the same program's control tree.

Launch performance is improved using a control tree structure, as is the time needed to restart a program after failure of a hardware element. While other computer systems relied on a one-to-all communications relationship between a control processor and the other processors in a processor group assigned to a specific program or task, the control tree in the examples presented here communicates with only a small number of processors, typically in the single digits, each of which is then responsible for forwarding control messages to a similar number of processors. As was seen in the examples of FIGS. 1 and 2, very high parallelism in message distribution can be achieved after only a few layers, resulting in very fast message distribution within the control tree. This results in configuration and program startup times that may take seconds instead of minutes, and improves the efficiency of other control messages and standard input/output messages within the control tree.

Although specific embodiments have been illustrated and described herein, it will be appreciated by those of ordinary skill in the art that any arrangement that achieve the same purpose, structure, or function may be substituted for the specific embodiments shown. This application is intended to cover any adaptations or variations of the example embodiments of the invention described herein. It is intended that this invention be limited only by the claims, and the full scope of equivalents thereof.

The invention claimed is:

1. A multiprocessor computer system, comprising:
   a control processor node;
   a plurality of attached processor nodes under control of the control processor node and coupled to one another and to the control processor node via a processor interconnect network such that the plurality of attached processor nodes and the control processor node comprise a single parallel computer machine; and
   a control tree structure comprising the control processor node and the plurality of attached processor nodes, the control tree structure operable to pass control messages from the control processor node to the plurality of attached processor nodes via the control tree structure such that two or more of the plurality of attached processor nodes are operable to pass messages to other attached processor nodes in parallel.

2. The multiprocessor computer system of claim 1, wherein the plurality of attached processor nodes are further operable to pass control messages to the control processor node via the control tree structure.

3. The multiprocessor computer system of claim 2, wherein the control messages comprise error messages.

4. The multiprocessor computer system of claim 2, wherein the control messages comprise standard output messages.

5. The multiprocessor computer system of claim 1, wherein the control messages comprise at least one of processor node reservation, processor node initialization, and processor node program information.

6. The multiprocessor computer system of claim 1, wherein the control messages comprise at least one of standard input and standard output messages.

7. The multiprocessor computer system of claim 1, wherein the control messages comprise at least one of error, restart, reservation cancellation, and broken control tree messages.

8. The multiprocessor computer system of claim 1, wherein the two or more of the plurality of attached processor nodes that are operable to pass messages to other attached processor nodes in parallel are operable to each independently receive a control message from a side of the control tree structure nearest the control processor node, and to each independently forward the control message to two or more processor nodes from a side of the control tree structure opposite the control processor node.

9. A method of operating a multiprocessor computer system, comprising:
sending control messages from a control processor node to a plurality of attached processor nodes via a control tree structure comprising the plurality of attached processor nodes and branching from the control processor node, such that two or more of the plurality of attached processor nodes are operable to send messages to other attached processor nodes in parallel, the plurality of attached processor nodes under control of the control processor node and coupled to one another and to the control processor node via a processor interconnect network such that the attached processor nodes and the control processor node comprise a single parallel computer machine.

10. The method of operating a multiprocessor computer system of claim 9, further comprising sending a control message from at least one of the plurality of attached processor nodes to the control processor node via the control tree structure.

11. The method of operating a multiprocessor computer system of claim 10, wherein the control message comprises an error message.

12. The method of operating a multiprocessor computer system of claim 10, wherein the control message comprises a standard output message.

13. The method of operating a multiprocessor computer system of claim 9, wherein the control messages comprise at least one of processor node reservation, processor node initialization, and processor node program information.

14. The method of operating a multiprocessor computer system of claim 9, wherein the control messages comprise at least one of standard input and standard output messages.

15. The method of operating a multiprocessor computer system of claim 9, wherein the control messages comprise at least one of error, restart, reservation cancellation, and broken control tree messages.

16. The method of operating a multiprocessor computer system of claim 9, wherein sending the messages to other attached processor nodes in parallel comprises each of the two or more of the plurality of attached processor nodes independently receiving a control message from a side of the control tree structure nearest the control processor node, and each of the two or more of the plurality of attached processor nodes independently forwarding the control message to two or more processor nodes from a side of the control tree structure opposite the control processor node.

17. A non-transitory machine-readable medium with instructions stored thereon, the instructions when executed operable to cause a multiprocessor computerized system to:
send control messages from a control processor node to a plurality of attached processor nodes via a control tree structure comprising the plurality of attached processor nodes and branching from the control processor node, such that two or more of the plurality of attached processor nodes are operable to send messages to other attached processor nodes in parallel, the plurality of attached processor nodes under control of the control processor node and coupled to one another and to the control processor node via a processor interconnect network such that the plurality of attached processor nodes and the control processor node comprise a single parallel computer machine.

18. The machine-readable medium of claim 17, the instructions when executed further operable to send control messages from at least one of the plurality of attached processor nodes to the control processor node via the control tree structure.

19. The machine-readable medium of claim 18, wherein the control messages comprises at least one of an error message and a standard output message.

20. The machine-readable medium of claim 17, wherein the control messages comprise at least one of a processor node reservation message, a processor node initialization message, processor node program information, a standard input message, a standard output message, an error message, a restart message, a reservation cancellation message, and a broken control tree message.

21. The machine-readable medium of claim 17, wherein sending messages to other attached processor nodes in parallel comprises each of the two or more of the plurality of attached processor nodes independently receiving a control message from a side of the control tree structure nearest the control processor node, and each of the two or more of the plurality of attached processor nodes independently forwarding the control message to the two or more of the plurality of attached processor nodes from a side of the control tree structure opposite the control processor node.

* * * * *